Oct. 9, 1962     J. F. BERTOLINO     3,057,064
LAWN EDGER
Filed June 20, 1960
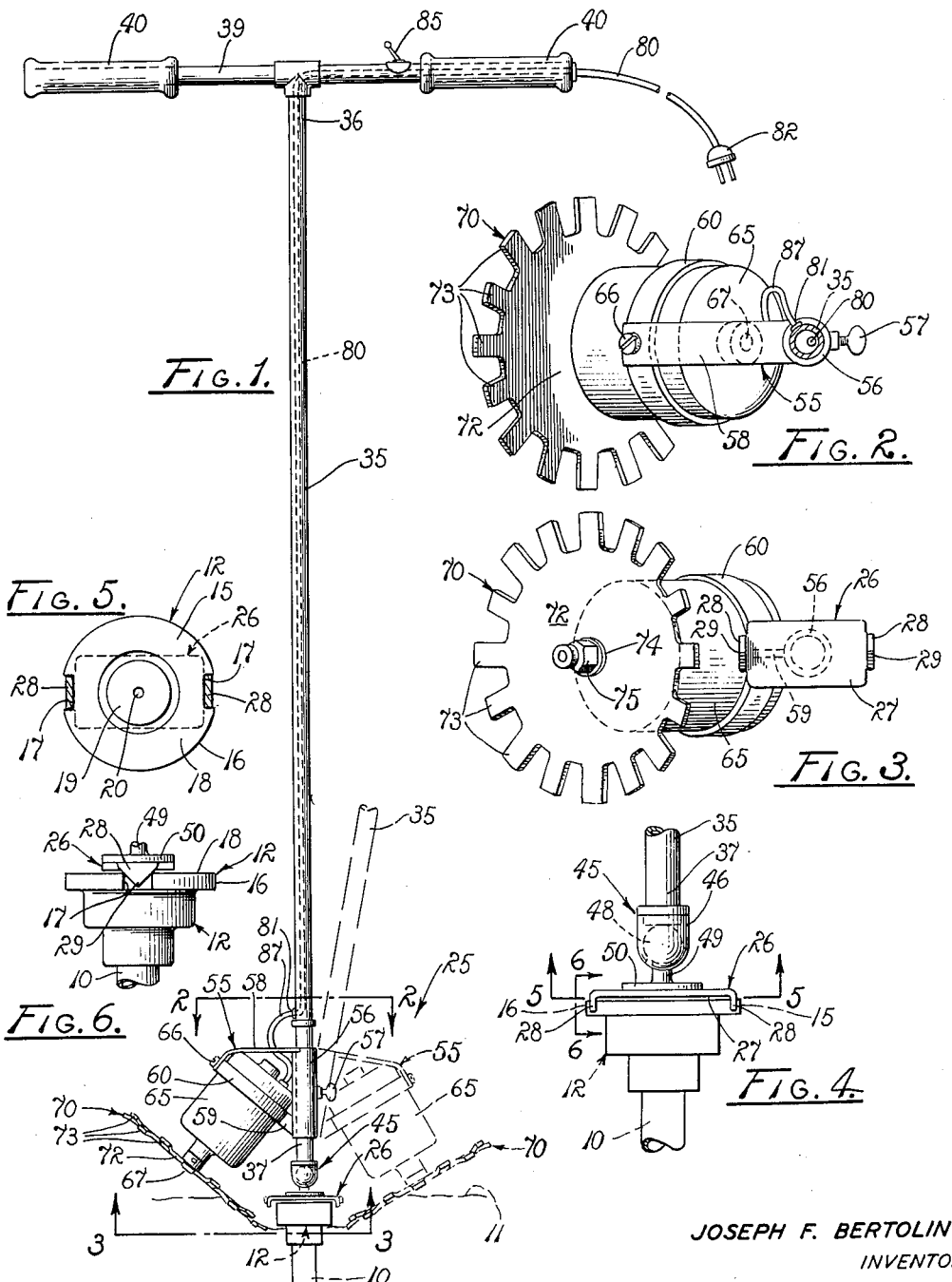
JOSEPH F. BERTOLINO
INVENTOR
HUEBNER & WORREL
ATTORNEYS
BY Richard M. Worrel 3,057,064
LAWN EDGER
Joseph F. Bertolino, 1522 W. Weldon, Fresno, Calif.
Filed June 20, 1960, Ser. No. 37,476
6 Claims. (Cl. 30—276)

The present invention relates to a lawn edger and more particularly to a powered apparatus for edging the grass and turf around certain fixtures, such as sprinkler heads, embedded in a lawn.

Lawns around homes, commercial buildings and golf courses frequently are provided with sprinkler systems having sprinkler heads providing upper surfaces usually slightly below the surface of the lawn. Such lawns are normally edged along their borders, for optimum appearance. However, for proper and effective operation of the sprinklers, the grass and turf should also be periodically removed from around the sprinkler heads.

Power edgers are available for cutting grass along edges of the lawn. These edgers operate best where the edging is performed along substantially straight or relatively widely arcuate concrete borders. They are unsatisfactory for edging around sprinkler heads or other fixtures where the line of cutting action has a relatively short radius of curvature.

Sprinkler head edging attachments are also available for certain power edgers and mowers. Such attachments include a blade mounted on a driven shaft for rotary movement in a circular path about the sprinkler head. Inasmuch as sprinklers are frequently positioned in the corners of a lawn which are bordered by concrete curbing, uncontrolled full circle rotation of an edging blade is unsatisfactory. Furthermore, certain hand edging tools have been provided for the purpose but these have either been ineffective in action or too difficult to operate to have wide appeal.

Accordingly, it is an object of the present invention to provide a powered lawn edger for edging the grass and turf around certain fixtures, such as sprinkler heads, embedded in the ground.

Another object is to enable the improved appearance of a lawn by edging around fixtures embedded therein.

Another object is to enable efficient operation of sprinklers embedded in a lawn.

Another object is to mount a lawn edging blade for controlled movement in a predetermined arcuate path of small radius of curvature.

Another object is to cut out a frusto-conical section of turf substantially symmetrically about a fixture head, or other fixed point in the turf.

Another object is to provide a lawn edging apparatus of the type described which is coupled to a sprinkler head for guiding movement of a lawn edging blade about the sprinkler head.

Another object is to provide a powered lawn edger which is easily manually controlled and which is adapted for cutting at various angles and spacings about a sprinkler head.

These, together with other objects, will become more fully apparent upon reference to the following description and accompanying drawing.

In the drawing:

FIG. 1 is a side elevation of a lawn edger embodying the principles of the present invention and shown in a position of use coupled to a sprinkler head and with an alternative position of the edger also being shown in dashed lines.

FIG. 2 is a somewhat enlarged, transverse section taken on line 2—2 in FIG. 1.

FIG. 3 is a bottom view taken from a position indicated by line 3—3 of FIG. 1.

FIG. 4 is a somewhat enlarged, fragmentary side elevation of the lower end of the lawn edger shown coupled to a sprinkler head.

FIG. 5 is a transverse section taken on line 5—5 in FIG. 4.

FIG. 6 is a somewhat enlarged, fragmentary side elevation of the lawn edger and sprinkler head as viewed from a position indicated by line 6—6 in FIG. 4.

Referring more particularly to the drawing, a riser conduit 10 is positioned in the turf 11 and mounts a sprinkler head 12 on the upper end thereof so that the sprinkler head is embedded in the ground or turf. The head has an outer portion 15 providing a substantially circular circumferential edge 16 in which are provided a pair of diametrically opposite, outwardly opening notches 17 conventionally serving as wrench sockets adapted to receive a wrench, not shown, for rotatably threading the sprinkler head on and off of the riser conduit. The outer portion of the head also has an upper face 18 which is usually slightly below the upper surface of the turf for mowing convenience. The sprinkler head provides an inner pop-up portion 19 mounted within the outer portion concentrically of the edge for movement between a retracted position substantially flush with the upper surface of the outer portion and an upwardly extended sprinkling position, not shown, but well-known in the art. The pop-up portion normally has a central orifice 20. The structure described to this point is entirely conventional and simply constitutes an illustrative operational environment.

A lawn edger embodying the principles of the present invention is generally indicated by the numeral 25 in FIG. 1. The edger provides a lower rectangular anchor plate 26 having a maximum dimension approximately the same as the diameter of the outer portion 15 of the sprinkler head 12 and providing a lower surface 27. Tapered lugs 28 are integrally, convergently, downwardly extended from the anchor plate and provide lower tips 29 spaced to be received in the notches 17 of the sprinkler head 12. The edger includes an elongated tubular standard 35 having upper and lower end portions 36 and 37, respectively. An elongated handle bar 39 is transversely connected to the upper end portion of the standard, and handle grips 40 are releasably slidably fitted on opposite ends of the handle bar.

The subject edger 25 also provides a universal coupling 45 having an upper female receptacle 46 secured to the lower end portion 37 of the standard 35 and downwardly extended therefrom, as best illustrated in FIGS. 1 and 4. The coupling also includes a lower ball portion 48 universally rotatably fitted in the receptacle. A shank 49 is concentrically downwardly extended from the ball portion, and a web 50 centrally secured to the anchor plate 26 is connected to the shank. In this manner the universal coupling interconnects the anchor plate and the standard for relative universal movement of the standard within a limited range relative to the anchor plate and for rotation relative thereto.

A mounting bracket 55 includes an elongated sleeve 56 longitudinally slidably fitted on the standard 35 and adapted for selective longitudinal positioning thereon by means of a setscrew 57. The bracket also has upper and lower arms 58 and 59 substantially radially outwardly extended from the sleeve and mounting an annular band 60 therebetween in oblique angular relation to the sleeve and thus to the standard.

An electric motor 65 is frictionally fitted within the band 60 and secured thereto by means of screws 66. The motor has a downwardly extended drive shaft 67 which provides an axis of rotation in downwardly divergent relation to the standard 35. The shaft has a terminal end in radially outwardly spaced relation, and generally opposite, to the universal coupling 45, as shown in FIG. 1.

A circular cutting blade 70 having opposite sides includes a central planar portion 72 and a plurality of circumferentially spaced teeth 73 radially outwardly extended from the central portion. The teeth are alternately extended toward opposite sides of the blade in oblique angular relation to said central portion, as best shown in FIG. 1. The blade provides a concentric aperture fitted over the drive shaft 67, and washers 74 are fitted over the shaft against the central portion of the blade. A nut 75 is screwthreadably connected to the outer end of the drive shaft and tightened against the washer thereby dependably securing the blade to the drive shaft for rotation therewith. It is to be noted, particularly in FIG. 1, that the blade is thereby mounted in upwardly divergent angular relation to the standard inasmuch as it is perpendicular to the drive shaft. Also, because of the mounting of the motor 65 and the position of the drive shaft 67, as above described, the downwardly, inwardly, directed cutting teeth 73 of the blade are adjacent to the anchor plate 26.

An electrical power cord 80 is connected to the motor 65, and is extended through an aperture 81 in the standard 35, thence upwardly through the standard, and outwardly through an end portion of the handle bar 39 to a plug 82 exteriorly of the standard. A control switch 85 is mounted in the handle bar and is connected to the power cord. The power cord has a lower slack portion 87 between its connection to the motor and its entry through the aperture so as to permit the desired elevational adjustment of the bracket 55 and the motor on the standard.

Operation

The operation of the described embodiment of the subject invention is believed to be readily apparent and is briefly summarized at this point. The bracket 55 is initially adjusted on the standard 35 so that the downwardly extended teeth 73 of the blade 70 are below the anchor plate 26. Assuming that it is desired to trim around the sprinkler head 12, the lugs 28 are fitted in the notches 17 of the sprinkler head so that the lower surface 27 of the anchor plate is against the upper face 18 of the head in overlying relation to the pop-up portion 19 and covering the orifice 20. It is to be noted that the lugs have a maximum width adjacent to the anchor plate which is greater than the width of the notches so that as the lugs are received in the notches, they frictionally engage the outer portion 15 of the sprinkler head. In this manner the edger is adaptable to various sprinkler head with different size notches so that in each instance, the anchor plate is dependably held against movement relative to the sprinkler head tending to displace it from the head. The plug 82 is connected to an electrical socket, not shown, and the switch 85 thrown into an "on" position to energize the motor 65 and rotate the blade 70.

Because of the described position of the blade 70 in relation to the anchor plate 26, with the standard 35 precisely coaxially upwardly extended from the anchor plate 26, the blade 70 is in angular relation to the turf 11 with its lower teeth adapted to cut into and penetrate the turf incident to blade rotation. As illustrated in dashed lines in FIG. 1, the angle of the blade relative to the ground is adjusted by tilting the standard with respect to the anchor plate and by virtue of the universal coupling 45 interconnecting the standard and the anchor plate. Of course, connection of the anchor plate to the sprinkler head by the interfitted lugs 28 and notches 17 precludes rotation of the anchor plate relative to the sprinkler head. Thus, tilting of the standard enables precise manual control of the blade angle.

The operator holds the grips 40 on the handle bar 39 and slowly rotates the standard 35 about its own axis and thus about the axis of the sprinkler head 12 as defined by a vertical line passing downwardly through the orifice 20. This cuts a substantially frusto-conical segment of turf around the sprinkler head 12. It is found that the alternately directed teeth 73 are particularly effective in neatly cutting into the turf so that the frusto-conical segment is easy to remove. In any angularly rotated position of the standard about its own axis, the standard can be tilted into acute angular relation with respect to the anchor plate 26 thereby to change the angular relation of the blade with respect to the ground. In this manner, the turf can be thoroughly and neatly trimmed around the sprinkler head. While normally rotation and tilting of the standard is adequate to provide a desired cut both as to radial distance from the sprinkler head and as to depth, the bracket 55 can be adjusted to provide a different depth of cut when desired. Also, although not specifically illustrated, it will be evident that the bracket arms 58 and 59 can be relatively lengthened and/or shortened to change the initial angular relation of the drive shaft 67 with respect to the standard.

It is to be noted that the subject edger 25 is adapted to trim around sprinklers positioned in the corners of a lawn adjacent to angularly related concrete borders just as effectively as around sprinkler heads located centrally of the lawn. The reason for this is that movement of the blade 70 about the sprinkler head is manually controlled although the blade is rotated by power about its own axis of rotation. Thus, the blade can be brought closely adjacent to concrete curbing for removing turf thereagainst and trimming the same from around the sprinkler head.

Dependable attachment of the anchor plate 26 to the sprinkler head 12 by the interfitted lugs 28 and notches 17 is particularly important because of the vibration imparted to the edger by operation of the motor 65. Notwithstanding this vibration, the described coupling dependably holds the ball portion 48 of the coupling 45 in substantially coaxial relation to the sprinkler head 12, thereby providing a relatively fixed point about which the standard is both rotated and tilted.

From the foregoing, it will be evident that a lawn edger has been provided for removing grass and turf about sprinkler heads or other similar fixtures such as cement clothesline bases, valve sockets and the like embedded in the ground and where common edging problems exist. The edger is coupled to the sprinkler head for guiding movement of the cutting blade in a predetermined path about the sprinkler head. Furthermore, the axis of rotation of the cutting blade is manually adjustable for varying the angle and depth of cut. Although the blade is power driven, its movement about the sprinkler head is manually controlled for greater cutting precision.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a lawn edger for cutting a frusto-conical section of turf around a sprinkler head embedded in a lawn and wherein the sprinkler has an upper face and a circumferential edge providing diametrically opposite notches, an anchor plate having a lower surface adapted to rest on the upper face of the sprinkler head and an upper surface; opposed lugs downwardly extended in spaced relation from the plate and adapted for releasable reception in the notches of such a sprinkler head; an elongated tubular standard having upper and lower ends and a longitudinal axis; a universal coupling having swively interconnected lower and upper portions respectively concentrically connected to the upper surface of the plate and to the lower end of the standard for enabling rotation of the standard relative to the plate and about the axis of the standard and also for enabling universal inclination of the standard from a central position coaxially upwardly extended from the plate into a plurality of positions outwardly tilted from said central position; a driven shaft; a bracket borne by the standard and mounting the shaft in oblique angular relation to the standard adjacent to the lower end thereof; and a cutting blade mounted on the driven shaft in circumferential juxtaposition to the anchor plate.

2. The edger of claim 1 wherein each of the lugs is convergently downwardly tapered from the coupling plate.

3. The edger of claim 1 wherein the driven shaft is divergently downwardly extended relative to the standard, and wherein the blade is substantially normal to the shaft in downwardly convergent relation to the standard and has a circumferential edge endwardly spaced of the anchor plate.

4. The edger of claim 3 wherein the blade has a plurality of teeth along said edge alternately angularly extended toward opposite sides of the blade.

5. The edger of claim 1 wherein an electric motor is mounted in the bracket; wherein said driven shaft is the output shaft of said motor; wherein a handle is right-angularly rigidly connected to the standard; and wherein a power cord is connected to the motor and extended upwardly in the standard and outwardly through the handle.

6. The edger of claim 1 wherein the bracket is axially adjustable on the standard.

References Cited in the file of this patent

UNITED STATES PATENTS

| | | |
|---|---|---|
| 1,765,288 | Schmidt | June 17, 1930 |
| 2,139,353 | Bruder | Dec. 6, 1938 |
| 2,312,569 | Maga | Mar. 2, 1943 |
| 2,764,926 | Heimbigner | Oct. 2, 1956 |
| 2,953,852 | Dehn | Sept. 27, 1960 |